United States Patent

[11] 3,612,091

| [72] | Inventors | Wolfgang Gramann, Nd-Gemunden; Helmut Holzer, Heilbronn, both of Germany |
|---|---|---|
| [21] | Appl. No. | 853,815 |
| [22] | Filed | Aug. 28, 1969 |
| [45] | Patented | Oct. 12, 1971 |
| [73] | Assignee | Telefunken Patentverwertungsgesellschaft m.b.H. Ulm/Danube, Germany |
| [32] | Priority | Sept. 2, 1968 |
| [33] | | Germany |
| [31] | | P 17 75 617.1 |

[54] GASTIGHT JOINT
8 Claims, 2 Drawing Figs.

[52] U.S. Cl. ................................................ 137/312,
137/246.22, 251/181, 285/96, 285/332.3, 285/DIG. 12
[51] Int. Cl. .................................................. F16k 5/02, F16l 49/00
[50] Field of Search ................................... 285/96, 94, DIG. 12, 93. 10, 332 3; 277/70; 137/312, 246.22, 237; 251/309, 181

[56] References Cited

UNITED STATES PATENTS

| 1,349,823 | 8/1920 | Eimer | 251/309 X |
| 1,884,642 | 10/1932 | Flake | 277/70 X |
| 2,760,673 | 8/1956 | Laurent | 285/96 X |
| 3,395,925 | 8/1968 | Dreiding | 251/309 X |

FOREIGN PATENTS

| 2,627 | 1885 | Great Britain | 251/309 |
| 958,345 | 5/1964 | Great Britain | 285/96 |

*Primary Examiner*—Thomas F Callagham
*Attorney*—Spencer & Kaye

ABSTRACT: The invention relates to a gastight joint, for example, for sealing gastight stop cocks or in joints between tubular parts in which sealing is carried out by means of an auxiliary gas flowing between the contact surfaces of the two parts. For this purpose an annular passage in the form of a bead like bulge is formed in the wall of one of the two parts. A sealing substance e.g. joint grease may be additionally used.

PATENTED OCT 12 1971　　3,612,091

Inventor:
Wolfgang Gramann
Helmut Holzer

By Spencer & Kaye
Attorneys

GASTIGHT JOINT

BACKGROUND OF THE INVENTION

The present invention relates to a gastight joint between two parts to be connected in a gastight manner. We are concerned primarily with joints which are to be found between the individual parts of apparatus containing gas and used for example for carrying out chemical or physical experiments, as at the joints between tubes for example, at the connecting points of reaction vessels or stop cocks, and in particular also between individual parts of these cocks themselves.

By the technique hitherto usual, gastight joints between the parts which are generally made of glass were realized by these parts being fitted precisely together at their contact faces, for example by grinding down irregularities and the like, and then being provided with joint grease before their assembly. This construction of apparatus containing gas is relatively simple in itself but in many cases is extremely uncertain, particularly when a gas, such as arsenic trichloride for example, which attacks joint grease and destroys the gastight joint formed by this grease, is to be contained in the apparatus in question. Using the previous technique, it was necessary to dispense with the use of joint grease in these cases and to construct gastight joints by using special metals or special alloys. In practice, this then means the use of metal cocks or the use of metal-sealed connecting pieces between the individual parts of apparatus containing gas as a result of which not only do the costs for setting up such apparatus rise very considerably but also at the same time the whole construction of such apparatus becomes liable to break down because of the extremely sensitive glass-to-metal joints which cannot be avoided in this case.

SUMMARY OF THE INVENTION

It is the object of the present invention to provide a gastight joint between two parts to be connected in a gastight manner, which does not have the disadvantages observed in the joints hitherto usual despite its simple construction.

According to the invention there is provided a gastight joint comprising two parts to be connected in gastight manner and means in one of said parts defining a passage for the flow of an auxiliary gas along the contact surface between said two parts.

BRIEF DESCRIPTION OF THE DRAWINGS

Two embodiments of the invention will now be described, by way of example, with reference to the accompanying drawings, in which.

DESCRIPTION OF THE PREFERRED EMBODIMENTS

Figure 1:
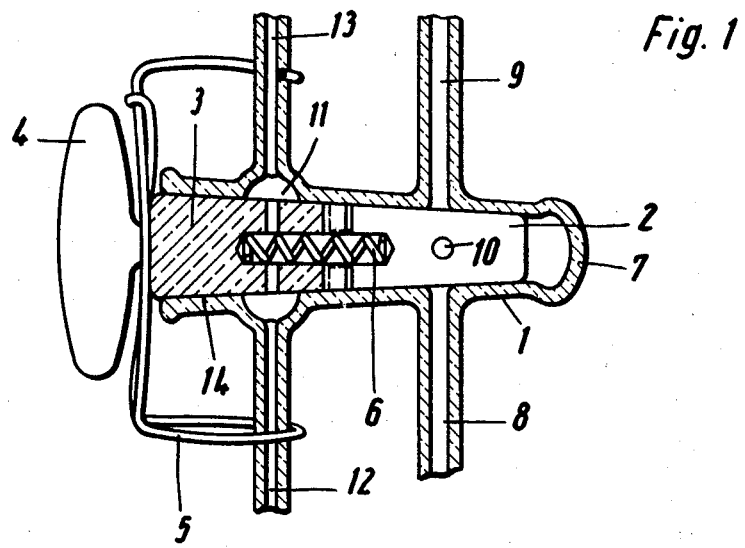
FIG. 1 is a sectional view of a gas tight stop cock in accordance with the invention.

Basically, the invention provides for a gastight joint or cock to have the face of one of its parts in contact with a second part so constructed that there is a closed passage for the flow of auxiliary gas along the contact surface between the two parts.

The advantage of the invention consists primarily in that a gas which has penetrated between the contact surfaces between the two parts forming the gastight joint is mostly carried away by the stream of auxiliary gas in the passage provided according to the invention so that an extremely small percentage thereof can diffuse in-between the two parts after overcoming the passage and penetrate the joint formed by these parts.

From this it follows that in many cases, sealing substances, such as joint grease for example, can be dispensed with entirely when using the invention. On the other hand, however, the use of such substances is also possible in those cases where hitherto it was impossible because of the presence of certain gases and recourse had to be made for extremely tight sealing to special cocks or special connecting pieces. Because of the stream of auxiliary gas in the passage provided according to the invention it is now possible, even in these cases, to provide the joints between two parts with a sealing substance, at least in that section which is separated by the passage from the area which contains a gas which decomposes sealing substances.

Thus the invention renders tight seals possible between contacting parts of an apparatus without the use of special parts and guarantees a simple and reliable construction for apparatus conveying gas, particularly because of the absence of glass-to-metal joints.

It should be specially emphasized here that, in the gastight joint according to the invention, a gas is of course necessary for the stream of auxiliary gas which does not in any way have a disadvantageous effect on the experiments or reactions being carried out in the apparatus in question in which the invention is used.

In the majority of cases in practice, in the gastight joint according to the invention, at least one of the two parts is tubular and then a second part, which matches it in cross section, projects at least partially into this first, tubular part and both parts bear one against the other in the region where they overlap. Furthermore, in this embodiment of the invention, at least one of the two parts comprises, at its contact surface, a channel-like recess extending transversely to the longitudinal axis of the first tubular part, which recess forms a closed, annular passage between the two parts, means then additionally being provided which permit an inflow and outflow of the auxiliary gas in and out of this passage.

In this embodiment of the invention, the annular passage characterizing the invention may be realized for example most appropriately by the wall of the first tubular part bulging out in the form of a bead around the whole circumference, two sockets then being provided on this bulge for the supply and discharge of the auxiliary gas in such a manner that they are situated on opposite sides of the longitudinal axis of the first part. The supply and discharge of the auxiliary gas may, however, if this appears more advantageous for technical reasons, may also be effected through supply ducts which then extend, for example, in the second part, parallel to the longitudinal axis of the first part and at one end enter the annular passage between the two parts at points on opposite sides of this longitudinal axis and run, at their other end, to the surface of the second part where the two parts no longer overlap and each lead into sockets provided there.

Figure 2:
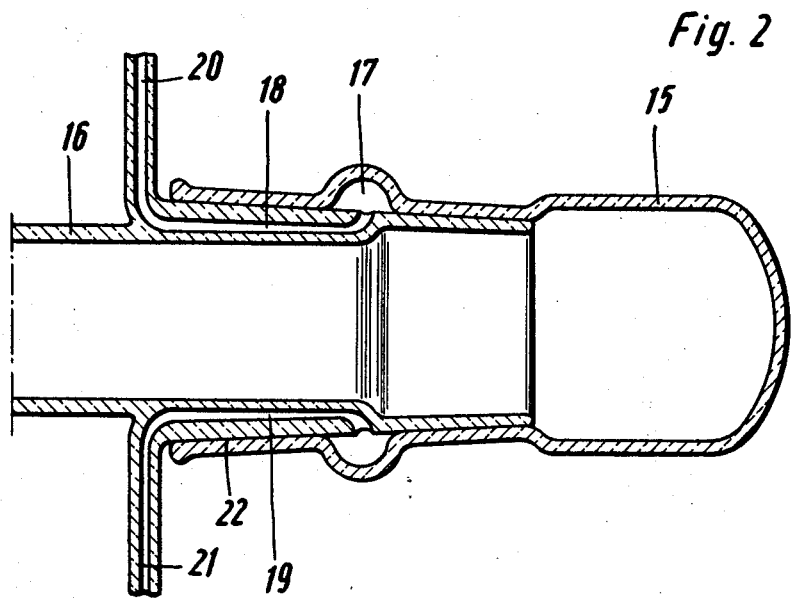
FIG. 2 is a sectional view of a gas tight joint in accordance with the invention.

Referring now to the drawings, FIG. 1 shows a cock in which a stream of gas can be varied in magnitude or interrupted completely in known manner by turning a plug provided with an aperture. In FIG. 2, on the other hand, a joint between two tubular parts is shown. It is common to both arrangements that there is a gastight connection, which is realized by means of the invention, between parts in contact—in FIG. 1 between the body of the cock and the plug in this body and in FIG. 2 between the two lengths of tube.

The cock illustrated in FIG. 1 consists essentially of a cock body 1 and a plug which is mounted for rotation in this body and which, for the sake of easier construction, is divided into two component parts 2 and 3 which are mechanically coupled together in such a manner that when the component part 3 is turned at its end 4 which is winged for this purpose, the component part 2 is also turned. The two component parts are urged towards the closed end 7 of the tubular cock body 1, which becomes narrower towards this end, by means of a resilient clip 5 and a spiral spring 6 disposed between them. It is, of course, also possible for there to be only a single plug in the cock body instead of the two component plug members 2 and 3, in which case the spiral spring 6 and the mechanical coupling between the two parts of the plug are eliminated. Because of the relatively great length which a single plug would have, however, the necessary accurate fit between plug and body would be extremely doubtful in this case.

The two connecting sockets 8 and 9, which are on opposite sides of the longitudinal axis of the cock body serve to supply and draw off the flow of gas to be regulated by the cock. At the point at which these two sockets enter the body of the cock, an aperture 10 is provided in the plug component part 2 so that, depending on the position of the plug, the two sockets 8 and 9 are in communication with one another through this aperture 10 or, if the aperture 10 assumes the position shown in FIG. 1, are separated from one another by the component part 2 of the plug. As distinct from known cocks of this kind, the construction shown in FIG. 1 comprises, at the wall of the body, a bead-shaped bulge 11 extending round the whole circumference of the tubular body. This bulge, which is provided between the open end of the body and the mouths of the two sockets 8 and 9, forms a closed, annular passage which, according to the invention, is between the two parts 1 and 3 of the cock forming a gastight joint and extends transversely to the longitudinal axis of the cock body, that is to say transversely to that direction in which a seal had to be obtained in the present case. The two supply sockets 12 and 13 are provided on the beadlike bulge 11 for the supply and discharge of the auxiliary gas.

Glass is particularly suitable for the manufacture of the cock shown in FIG. 1 in which case, if the plug is divided into two component plugs 2 and 3, the component plug 2 may be made of a resilient material, for example of Teflon, and the component plug 3 of glass. In this manner, a very satisfactory seal is obtained between the body 1 and the plug portion 2 and a resulting high shutoff action of the cock with respect to the flow of gas to be regulated by this cock, without having to dispense with the advantage that the cock is sealed off from the outside by a joint between two glass members which, if necessary, may also be provided with joint grease or another sealing substance, at least in the region 14 between the beadlike bulge 11 and the open end of the cock body 1.

FIG. 2 shows the connection of two tubular parts 15 and 16 wherein the passage provided according to the invention is likewise realized by means of a bulge. This bulge, designated by the numeral 17, is in the present case, on the tubular portion 15 which represents a gastight closure for the tube 16 and is closed at its free end for this purpose. The supply and discharge of the auxiliary gas to and from the annular passage formed by the bulge 17 between the two parts 15 and 16 is effected through the ducts 18 and 19 which extend in the wall of the tube 16, parallel to the longitudinal axis thereof, and which lead with one end to two points opposite one another on this longitudinal axis in the annular passage formed by the bulge and with the second end lead into one of the two sockets 20 and 21 provided on the outer wall of the tube 16.

Here, too, the two parts may be provided with joint grease or another sealing substance at least in the region 22 between the beadlike bulge 17 and the open end of the tubular portion 15, if this is necessary in order to obtain a particularly tight seal, even if there is a gas in the area bounded by the two parts of the tube which decomposes such substances used for sealing.

For the sake of completeness, attention may also be drawn to the fact that, instead of the ducts 18 and 19, sockets may also be provided in the present case as in FIG. 1, on the beadlike bulge 17, itself for the supply and discharge of the auxiliary gas. Furthermore, the arrangement of a gastight joint illustrated in FIG. 2 is, of course, also suitable for connecting two continuous tubes, in which case the closed tube portion 15 in FIG. 2 should merely be replaced by a continuous tube.

What I claim as new and desire to secure by Letters Patent of the United States is:

1. A gastight joint comprising a first tubular glass part having a first annular tapered surface, a second tubular glass part having a second annular tapered surface which projects into said first tapered surface so as to contact and bear against said first tapered surface, means on one of said parts defining at its tapered surface a channellike recess which extends transversely to the longitudinal axis of said first tubular part to provide a closed annular passage between said first and second parts, a gas supply and a gas discharge tube extending radially outwardly from the tubular parts and in communication with said recess, and means for permitting continuous inflow and outflow of auxiliary gas to and from said annular passage and along the contact surface between said tubular parts.

2. A gastight joint as defined in claim 1, wherein said first tubular part defines said channellike recess at its inside.

3. A gas tight joint as defined in claim 2, wherein the wall of said first tubular part is bulged outwards in the form of a bead to produce said channellike recess.

4. A gastight joint as defined in claim 3, wherein said gas supply and gas discharge tubes are situated on opposite sides of the longitudinal axis of said first tubular part.

5. A gastight joint as defined in claim 3, wherein said means for permitting inflow and outflow of auxiliary gas comprise two ducts extending parallel to said longitudinal axis of said first tubular part and entering at one end said annular passage at two points on opposite sides of said longitudinal axis of said first tubular part, and the other ends of said two ducts being in communication with said gas supply and gas discharge tubes.

6. A gastight joint as defined in claim 1, wherein said first tubular part comprises a cock body which narrows towards a closed end and said second tubular part comprise, at least part of a plug for said cock body, the wall of said cock body being bulged, outwards in the form of a bead between the open end of said body to form said annular passage and means for permitting supply and discharge of the gas whose flow is to be regulated by the plug.

7. A gastight joint as defined in claim 1, further comprising a sealing substance provided at the tapered surfaces of said first and second tubular parts.

8. A gastight joint as defined in claim 7, wherein said sealing substance is joint grease.